United States Patent
Han et al.

(10) Patent No.: US 10,983,744 B2
(45) Date of Patent: Apr. 20, 2021

(54) TERMINAL RECEIVING CONTENT BASED ON NETWORK ENVIRONMENT AND CONTROLLING METHOD THEREOF

(71) Applicant: LG ELECTRONICS INC., Seoul (KR)

(72) Inventors: Jongwoo Han, Seoul (KR); Guntae Bae, Seoul (KR); Jungho Lee, Seoul (KR); Jongpil Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/654,954

(22) Filed: Jul. 20, 2017

(65) Prior Publication Data

US 2018/0039469 A1 Feb. 8, 2018

(30) Foreign Application Priority Data

Aug. 2, 2016 (KR) .................. 10-2016-0098323

(51) Int. Cl.
*G06F 3/0482* (2013.01)
*G06F 3/14* (2006.01)
(Continued)

(52) U.S. Cl.
CPC ............ *G06F 3/1423* (2013.01); *G06F 3/041* (2013.01); *G06F 3/0486* (2013.01); *G06F 3/0488* (2013.01); *G06F 3/04815* (2013.01); *G06F 3/04817* (2013.01); *G06F 3/04842* (2013.01); *G06F 3/1431* (2013.01); *G06F 3/1462* (2013.01); *G09G 5/14* (2013.01); *H04M 1/7253* (2013.01); *H04M 1/72555* (2013.01);
(Continued)

(58) Field of Classification Search
CPC .. G06F 3/1423; G06F 3/04842; G06F 3/1462; G06F 3/04817; G06F 3/0486; G06F 3/1431; G06F 3/041; G06F 3/0488; G06F 3/044; G06F 3/04815; G06F 2203/04101; G06F 2203/04806; H04M 1/7253; G09G 5/14; G09G 2370/16
See application file for complete search history.

(56) References Cited

U.S. PATENT DOCUMENTS

2006/0004685 A1* 1/2006 Pyhalammi ............ G06F 16/54
2008/0039111 A1 2/2008 Ahuja et al.
(Continued)

FOREIGN PATENT DOCUMENTS

| JP | 2012-113400 A | 6/2012 |
|---|---|---|
| KR | 10-2011-0043815 A | 4/2011 |
| KR | 10-2014-0035022 A | 3/2014 |

*Primary Examiner* — Jeanette J Parker
(74) *Attorney, Agent, or Firm* — Birch, Stewart, Kolasch & Birch LLP

(57) ABSTRACT

A terminal and operating method thereof includes receiving a plurality of contents, classifying the plurality of received contents into a plurality of groups based on recipient information of a recipient corresponding to a user of the terminal, and outputting the plurality of contents classified into the plurality of groups in order corresponding to the recipient information. A thumbnail image represents each of the plurality of groups. The thumbnail image is displayed in accordance with the recipient information, such as a thumbnail image of a group considered to be more of interest to a user displayed in a larger size.

12 Claims, 18 Drawing Sheets

(51) Int. Cl.
  *G06F 3/0484* (2013.01)
  *G06F 3/0481* (2013.01)
  *H04M 1/725* (2021.01)
  *G06F 3/041* (2006.01)
  *G06F 3/0486* (2013.01)
  *G06F 3/0488* (2013.01)
  *G09G 5/14* (2006.01)

(52) U.S. Cl.
  CPC .............. *G06F 2203/04101* (2013.01); *G06F 2203/04806* (2013.01); *G09G 2370/16* (2013.01)

(56) References Cited

U.S. PATENT DOCUMENTS

| | | | |
|---|---|---|---|
| 2011/0205435 A1* | 8/2011 | Lee | H04N 5/44543 348/563 |
| 2011/0258559 A1* | 10/2011 | You | G06Q 10/107 715/752 |
| 2012/0151540 A1* | 6/2012 | Stanwood | H04L 65/00 725/109 |
| 2012/0177292 A1* | 7/2012 | Cheon | H04N 21/43615 382/190 |
| 2013/0125002 A1* | 5/2013 | Spaeth | G06F 3/0482 715/731 |
| 2013/0225236 A1 | 8/2013 | Lee et al. | |
| 2015/0100895 A1* | 4/2015 | Parmar | H04L 51/10 715/752 |
| 2015/0143299 A1* | 5/2015 | Kim | G06F 3/0482 715/835 |
| 2015/0189348 A1 | 7/2015 | Wang et al. | |
| 2015/0244794 A1* | 8/2015 | Poletto | H04L 67/1085 715/748 |
| 2016/0202889 A1 | 7/2016 | Shin et al. | |
| 2016/0255410 A1* | 9/2016 | Itoh | H04N 21/25891 725/14 |
| 2019/0124402 A1* | 4/2019 | Nagai | H04N 21/44222 |

* cited by examiner (a) User tendency analysis (b) 1st example (c) 2nd example

TERMINAL RECEIVING CONTENT BASED ON NETWORK ENVIRONMENT AND CONTROLLING METHOD THEREOF

Pursuant to 35 U.S.C. § 119(a), this application claims the benefit of earlier filing date and right of priority to Korean Application No. 10-2016-0098323, filed on Aug. 2, 2016, the contents of which are hereby incorporated by reference herein in their entirety.

BACKGROUND OF THE INVENTION

Field of the Invention

The present invention relates to a terminal, and more particularly, to a terminal and controlling method thereof. Although the present invention is suitable for a wide scope of applications, it is particularly suitable for appropriately providing a user of the terminal with a received content based on user information.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, a terminal-to-terminal data transmission is performed in general and a content such as an image or a video is transmitted to a different user's terminal through a messenger application or a message.

Regarding a content transmission using a terminal-to-terminal communication, as a user can transmit and receive contents using a terminal of the user, it is considerably advantageous in that the content transmission is conveniently usable anytime, anyplace.

However, regarding a content sharing or sending using a terminal-to-terminal communication, since contents are just transmitted in order of being transmitted by a sending user or a content selected by the sending user is transmitted only, it causes a problem that it is inconvenient for a receiving user to check or save the transmitted content.

Moreover, when various contents are shared, it may cause a problem that a user has difficulty in memorizing what kind of content was transmitted to a specific person or who possesses a specific content.

SUMMARY OF THE INVENTION

Accordingly, embodiments of the present invention are directed to a terminal and controlling method thereof that substantially obviate one or more problems due to limitations and disadvantages of the related art.

One object of the present invention is to provide a terminal and controlling method thereof, by which a plurality of received contents can be provided to a recipient in a manner of being sorted to be easily checked by the recipient.

Another object of the present invention is to provide an intuitive sharing interface for a shared or edited content.

Further object of the present invention is to provide a terminal and controlling method thereof, by which a sharing history for a shared content can be managed and checked easily.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of operating a terminal according to one embodiment of the present invention may include receiving a plurality of contents, classifying a plurality of the received contents into a plurality of groups based on recipient information of a recipient corresponding to a user of the terminal, and outputting a plurality of the contents classified into a plurality of the groups in order corresponding to the recipient information.

In the method of operating the terminal, the classifying a plurality of the received contents into a plurality of the groups may include classifying a plurality of the received contents into a plurality of the groups with reference to a character included in each of a plurality of the received contents and the outputting a plurality of the contents classified into a plurality of the groups in the order corresponding to the recipient information may include determining a priority of each of a plurality of the classified groups based on preference of the user for the character corresponding to each of a plurality of the groups and outputting a plurality of the contents classified into a plurality of the groups in the order corresponding to the determined priority.

In the method of operating the terminal, the method may further include outputting a plurality of the contents classified into a plurality of the groups in form corresponding to the recipient information.

In the method of operating the terminal, the outputting a plurality of the contents classified into a plurality of the groups in form corresponding to the recipient information may include outputting a plurality of the contents classified into a plurality of the groups in size corresponding to the determined priority.

In the method of operating the terminal, the recipient information may include personal information of the recipient corresponding to the user of the terminal and information on at least one of user tendency, preference, interest, interested place, schedule, character related to the character, and thing.

In the method of operating the terminal, the receiving a plurality of the contents may include determining a network environment of the terminal and receiving a portion of a plurality of the contents only based on the determined network environment.

In the method of operating the terminal, the method may further include obtaining an input for selecting at least one group from a plurality of the groups and storing only at least one content belonging to the group corresponding to the obtained input among a plurality of the received contents.

In the method of operating the terminal, the outputting a plurality of the contents classified into a plurality of the groups in the order corresponding to the recipient information may include outputting a plurality of thumbnails respectively representing a plurality of the groups in the order corresponding to the recipient information.

In the method of operating the terminal, the method may further include obtaining a first input for creating an edited content for at least one content, obtaining a second input for selecting a reference object becoming a reference for the creation of the edited content, and creating the edited content for the at least one content based on the recipient information and the selected reference object.

In the method of operating the terminal, the method may further include obtaining a third input for transmitting the created edited content and transmitting the edited content having the reference object set to an object corresponding to the obtained third input.

In another aspect of the present invention, as embodied and broadly described herein, a terminal in receiving a content according to one embodiment of the present invention may include a memory, a display, a wireless communication unit, and a controller configured to receive a plurality of contents through the wireless communication unit, classify a plurality of the received contents into a plurality of groups based on recipient information of a recipient corresponding to a user of the terminal, and control the display to output a plurality of the contents classified into a plurality of the groups in order corresponding to the recipient information.

In the terminal, the controller may classify a plurality of the received contents into a plurality of the groups with reference to a character included in each of a plurality of the received contents, determine a priority of each of a plurality of the classified groups based on preference of the user for the character corresponding to each of a plurality of the groups, and control the display to output a plurality of the contents classified into a plurality of the groups in order corresponding to the determined priority.

In the terminal, the controller may control the display to output a plurality of the contents classified into a plurality of the groups in form corresponding to the recipient information.

In the terminal, the controller may control the display to output a plurality of the contents classified into a plurality of the groups in size corresponding to the determined priority.

In the terminal, the recipient information may include personal information of the recipient corresponding to the user of the terminal and information on at least one of user tendency, preference, interest, interested place, schedule, character related to the character, and thing.

In the terminal, the controller may determine a network environment of the terminal and control the wireless communication unit to receive a portion of a plurality of the contents only based on the determined network environment.

In the terminal, the controller may obtain an input for selecting at least one group from a plurality of the groups and control the memory to store only at least one content belonging to the group corresponding to the obtained input among a plurality of the received contents.

In the terminal, the controller may control the display to output a plurality of thumbnails respectively representing a plurality of the groups in the order corresponding to the recipient information.

In the terminal, the controller may obtain a first input for creating an edited content for at least one content, obtain a second input for selecting a reference object becoming a reference for the creation of the edited content, and create the edited content for the at least one content based on the recipient information and the selected reference object.

In the terminal, the controller may obtain a third input for transmitting the created edited content and control the wireless communication unit to transmit the edited content having the reference object set to an object corresponding to the obtained third input.

Accordingly, embodiments of the present invention provide various effects and/or features.

First of all, a terminal according to an embodiment of the present invention sorts a plurality of received contents based on user information and then provides the sorted contents to a user, thereby enabling a user to easily check and save a user-desired content or a user-interested content.

Secondly, the present invention simply creates a user-desired editing content and easily shares the content with another user.

Thirdly, since the present invention enables a user to check a sharing history of a shared content, a content shared with another person can be easily checked and duplication of a content sharing can be prevented.

Additional scope of applicability of the present invention will become clear from the detailed description of the invention in the following. Yet, since it will be apparent to those skilled in the art that various modifications and variations can be made therein without departing from the spirit and scope of the invention, it is to be understood that the following detailed description of the present invention and a specific embodiment such as a preferred embodiment of the present invention are exemplary and explanatory.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Figure 1:
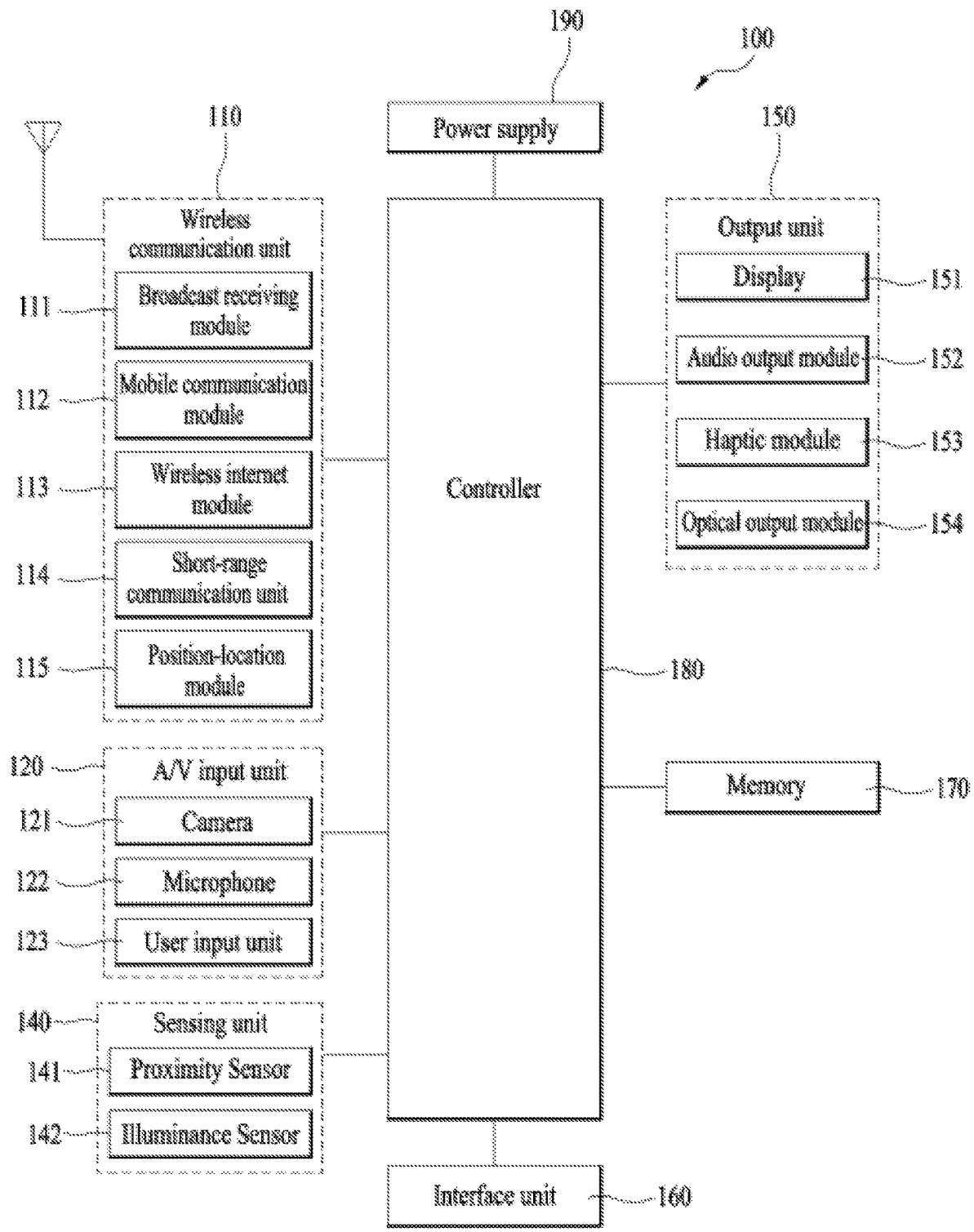
FIG. 1 is a block diagram to describe a terminal related to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

FIG. 1 is a block diagram of a mobile terminal in accordance with the present disclosure The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LIE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A terminal according to various embodiments of the present invention may receive a plurality of contents from another terminal, a server and the like and output a plurality of the received contents in a manner of sorting or classifying the received contents based on user information of the terminal. In this case, the user information may include various informations such as a user's tendency, a preference, a character related to a user, a thing related to the user, a user's interest, an interested place, a schedule information and the like as well as a personal information of the user. Hence, the user information may include an information related to a user's life as well as a terminal use of the user. The contents may include informations or results of various types such as an image, a video, an audio, a text and the like. Since the aforementioned user information is a user information of a recipient receiving a content, it may be called a recipient information. In the following description, the user information and the recipient information are interchangeably usable. And, the user information and the recipient information may be used in a manner of indicating the same meaning.

This is described in detail as follows.

Figure 2:
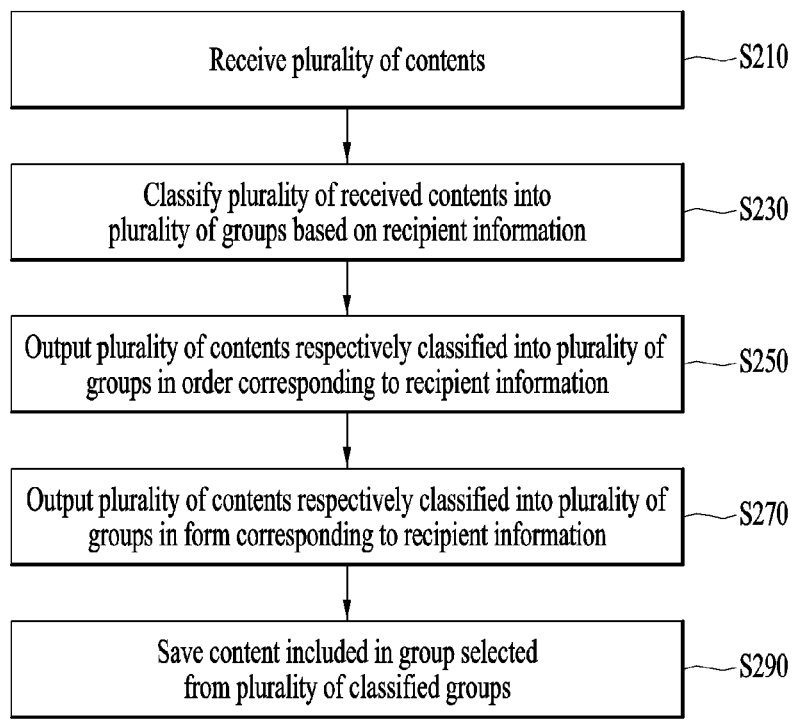
FIG. 2 is a flowchart for a method of operating a terminal according to various embodiments of the present invention.

FIG. 2 is a flowchart for a method of operating a terminal according to various embodiments of the present invention.

Referring to FIG. 2, the terminal 100 may receive a plurality of contents [S210].

The terminal 100 may receive a plurality of contents by communicating directly with various devices such as a different terminal 100, a server and the like, or receive a plurality of contents via a network. In doing so, a plurality of the contents received by the terminal may include a plurality of the contents selected and sorted by a counterpart or a counterpart device having transmitted the contents or a plurality of the contents received by a plurality of terminals at a time.

Based on a recipient information, the terminal 100 may classify a plurality of the received contents into a plurality of groups [S230].

Based on at least one of various informations included in the recipient information, the terminal 100 may classify a plurality of the received contents into a plurality of groups. Herein, each of a plurality of the groups may have a single reference or a plurality of different references.

For instance, based on character information included in the recipient information, the controller 180 of the terminal 100 may classify a plurality of the received contents by character. For one example, the controller 180 may classify a plurality of the received contents into a plurality of groups with reference to a single character or a plurality of characters.

For another instance, based on preference information included in the recipient information, the controller 180 of the terminal 100 may classify a plurality of the received contents by character or object.

Based on a plurality of different references included in the recipient information, the controller 180 of the terminal 100 may classify a plurality of the received contents into a plurality of groups. For instance, in further consideration of user's preferred character information as well as character information included in each of a plurality of the contents, the controller 180 may classify a plurality of the received contents into a plurality of groups. Hence, the controller 180 may classify each character intimate with a user into a single group and may classify characters of low intimacy into a single group or a plurality of groups.

Meanwhile, based on the recipient information, when the terminal 100 classifies a plurality of the received contents into a plurality of groups, it may classify similar contents as a same group. Hence, the terminal 100 may classify similar contents in a plurality of the received contents as a same group.

Thus, based on the user information, the terminal may classify a plurality of the received contents into a plurality of the groups. The above description is just one example, and a plurality of the received contents may be classified into a plurality of groups based on various informations included in user information.

The terminal 100 may output a plurality of the contents classified into a plurality of groups in order corresponding to the recipient information, respectively [S250].

The controller 180 of the terminal 100 may output a plurality of the contents respectively classified into a plurality of the groups in order corresponding to user information such as user's tendency, user's preference, user's interest or the like. Hence, the terminal 100 may output a plurality of the contents in order of user's interest, or may arrange or sort a plurality of the contents in order of interest.

Herein, the outputting in order corresponding to the recipient information may mean outputting a plurality of contents included in each of a plurality of groups in order of each of a plurality of the groups as well as disposing or arranging a plurality of contents included in each of a plurality of groups in order of each of a plurality of the groups on a single screen.

For one example, the controller 180 may output a plurality of contents respectively classified into a plurality of groups in order corresponding to user preference for each of a plurality of groups. Hence, the controller 180 may output the contents by starting with a content included in a group preferred by a user.

For instance, the controller 180 may output a plurality of contents included in each group in order of character or thing preferred by a user among a plurality of groups classified as character or thing included in a content.

The terminal 100 may output a plurality of the contents respectively classified into a plurality of the groups in form corresponding to the recipient information [S270].

The controller 180 of the terminal 100 may output a plurality of the contents respectively classified into a plurality of the groups in at least one of the forms (e.g., content output size, thumbnail size of content, output location, output color, output shape, output effect, etc.) corresponding to the user information.

Hence, the terminal 100 may output a user-interested content in size larger than that of other contents, and may output the user-interested content to a location at which the corresponding content can be checked ahead of other contents. Moreover, the terminal 100 may highlight and output the user-interested content to facilitate user's check.

For one example, the controller 180 may output a plurality of the contents respectively classified into a plurality of the groups in size corresponding to user preference for each of a plurality of the groups. Hence, the controller 180 may display a content included in a user-preferred group in large size and may display a content included in a group of user's low preference in small size. When the controller 180 displays a plurality of contents within a single screen, it may display them in size corresponding to user's reference as well.

For another example, the controller 180 may output a plurality of contents classified into a plurality of groups to locations corresponding to user preferences for a plurality of the groups, respectively. Hence, when the controller 180 displays a plurality of the contents on a single screen, the controller 180 may display a content included in a user-preferred group and a content included in a group of low user's preference on a top end and a bottom end of the screen, respectively. Moreover, when the controller 180 displays a plurality of contents on a single window or a predetermined region, the controller 180 may display a content included in a user-preferred group and a content included in a group of low user's preference on a top end and a bottom end of the window or region, respectively.

For further example, the controller 180 may output a plurality of contents classified into a plurality of groups with output effects corresponding to user preferences for a plurality of the groups, respectively. Hence, when the controller 180 displays a plurality of contents on a single screen, the controller 180 may display a content included in a user-preferred group with a highlight effect and may display a content included in a group of user's low preference without a highlight effect. And, the controller 180 may display a plurality of contents classified into a plurality of groups with highlight effects corresponding to user's preferences, respectively.

The terminal 100 may save the content included in the group selected from a plurality of the classified groups [S290].

The controller 180 of the terminal 100 may save at least one content included in the selected group among a plurality of the contents classified into a plurality of the groups to the memory 170. Accordingly, the terminal 100 may save only the content included in the group selected from a plurality of the transmitted contents. Hence, a user may selectively save a desired content among a plurality of the transmitted contents only.

A detailed embodiment for the operation of the terminal 100 mentioned in the foregoing description is described as follows.

Figure 3:
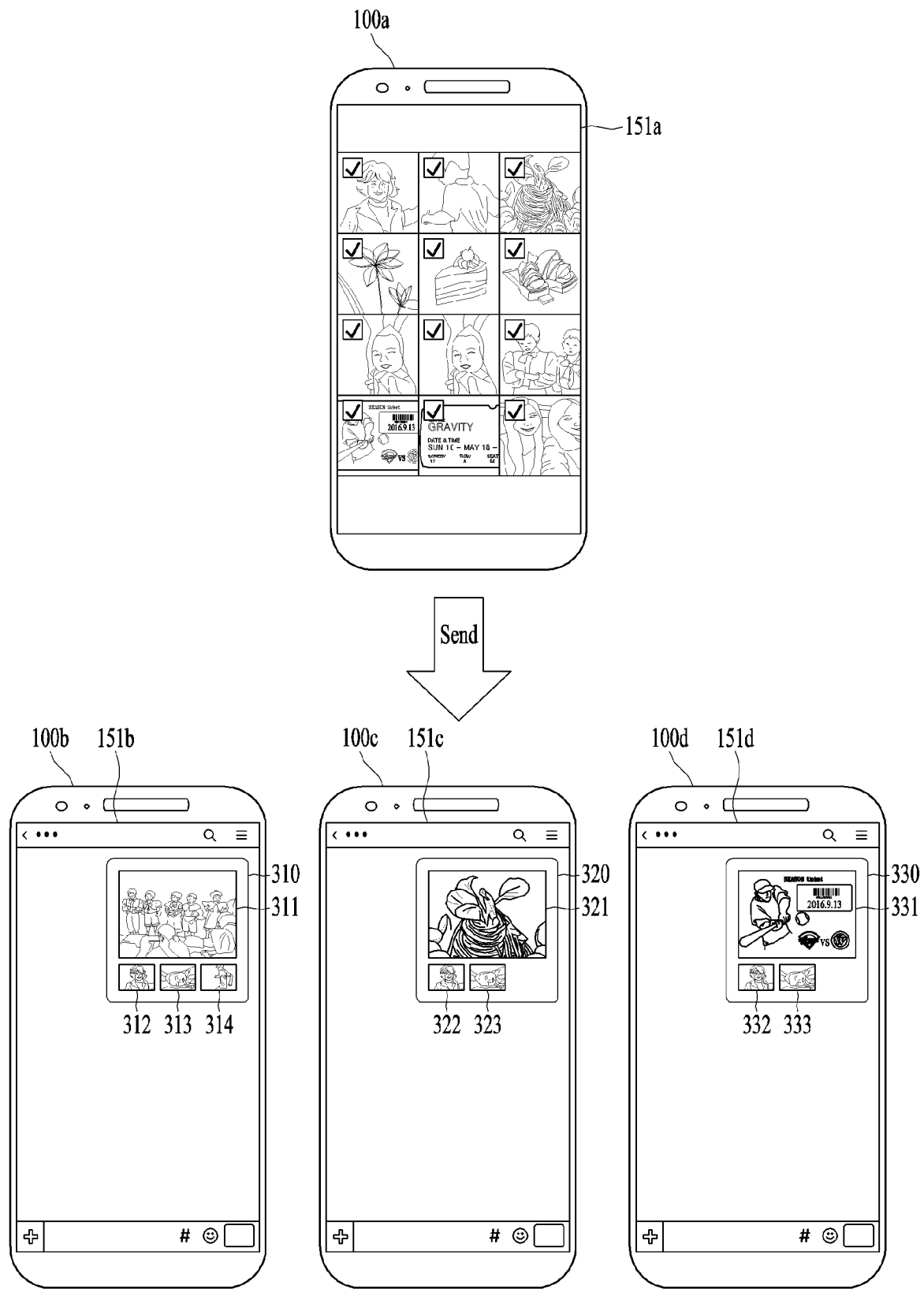
FIG. 3 is a diagram of a per-user output screen for a received image according to various embodiments of the present invention.

FIG. 3 is a diagram of a per-user output screen for a received image according to various embodiments of the present invention.

Referring to FIG. 3, a first terminal 100a may transmit a plurality of images to each of a second terminal 100b, a third terminal 100c and a fourth terminal 100d. A plurality of the images transmitted to each of the second terminal 100b, the third terminal 100c and the fourth terminal 100d by the first terminal 100a are the same images and may be transmitted in the same order or arrangement. And, a plurality of the images transmitted to the second terminal 100b, the third terminal 100c and the fourth terminal 100d may include selected images or images displayed on a display unit 151a.

Each of the second terminal 100b, the third terminal 100c and the fourth terminal 100d may receive a plurality of the transmitted images. The second terminal 100b, the third terminal 100c and the fourth terminal 100d may classify a plurality of the received images into a plurality of groups based on user informations of a second user, a third user and a fourth user of the second terminal 100b, the third terminal 100c and the fourth terminal 100d, respectively. Each of the second terminal 100b, the third terminal 100c and the fourth terminal 100d may display a thumbnail of an image of a group containing a character or thing frequently viewed by a user among the images classified into a plurality of the groups. For instance, each of the second terminal 100b, the third terminal 100c and the fourth terminal 100d can display a thumbnail of an image capable of representing each of a plurality of the groups. And, each of the second terminal 100b, the third terminal 100c and the fourth terminal 100d may display a thumbnail of corresponding to each of a plurality of the groups on a single window or a message window.

For one example, with reference to characters included in a plurality of the received images, the second terminal 100b may classify a plurality of the received images into a plurality of groups. And, the second terminal 100b may create a thumbnail for the character corresponding to each of the groups. For instance, the second terminal 100b may display a first thumbnail 311 for a first group corresponding to a first character, a second thumbnail 312 for a second group corresponding to a second character, a third thumbnail 313 for a third group corresponding to a third character, and a fourth thumbnail 314 for a fourth group corresponding to a fourth character on a message window 310. The second user corresponding to the user of the second terminal 100b may have a highest preference for the first character among the first to fourth characters and a lowest preference for the fourth character. Hence, the second terminal 100b may display the first thumbnail 311, which corresponds to the first character, in largest size on a top end of the message window 310. And, the second terminal 100b may sequentially display the second to fourth thumbnails 312 to 314 in the same size on a bottom end of the message window 310.

With reference to things or characters included in a plurality of the received images, the third terminal 100c may classify a plurality of the received images into a plurality of groups. And, the third terminal 100c may create a thumbnail for the thing or character corresponding to each of the groups. For instance, the third terminal 100c may display a first thumbnail 321 for a first group corresponding to food, a second thumbnail 322 for a second group corresponding to a second character, and a third thumbnail 323 for a third group corresponding to a third character on a message window 320. The third user corresponding to the user of the third terminal 100c may have a highest preference for the food and high preferences for the second and third characters. Hence, the second terminal 100b may display the first thumbnail 321, which corresponds to the food, in largest size on a top end of the message window 320. And, the third terminal 100c may sequentially display the second and third thumbnails 322 and 323 in the same size on a bottom end of the message window 320.

With reference to things or characters included in a plurality of the received images, the fourth terminal 100d may classify a plurality of the received images into a plurality of groups. And, the fourth terminal 100d may create a thumbnail for the thing or character corresponding to each of the groups. For instance, the fourth terminal 100d may display a first thumbnail 331 for a first group corresponding to a ticket, a second thumbnail 332 for a second group corresponding to a second character, and a third thumbnail 333 for a third group corresponding to a third character on a message window 330. The fourth user corresponding to the user of the fourth terminal 100d may have a highest interest in the ticket according to a schedule and high interests for the second and third characters. Hence, the fourth terminal 100d may display the first thumbnail 331, which corresponds to the ticket, in largest size on a top end of the message window 330. And, the fourth terminal 100d may sequentially display the second and third thumbnails 332 and 333 in the same size on a bottom end of the message window 330.

Thus, the terminal 100 according to various embodiments of the present invention may display a plurality of received contents according to user information (e.g., user's tendency, preference, interest, etc.), thereby receiving a plurality of the received contents in a manner of processing then into contents of a recipient corresponding to a user of a receiving terminal only. Therefore, the terminal 100 may display a screen for a plurality of the received contents differently depending on the recipient.

Figure 4:
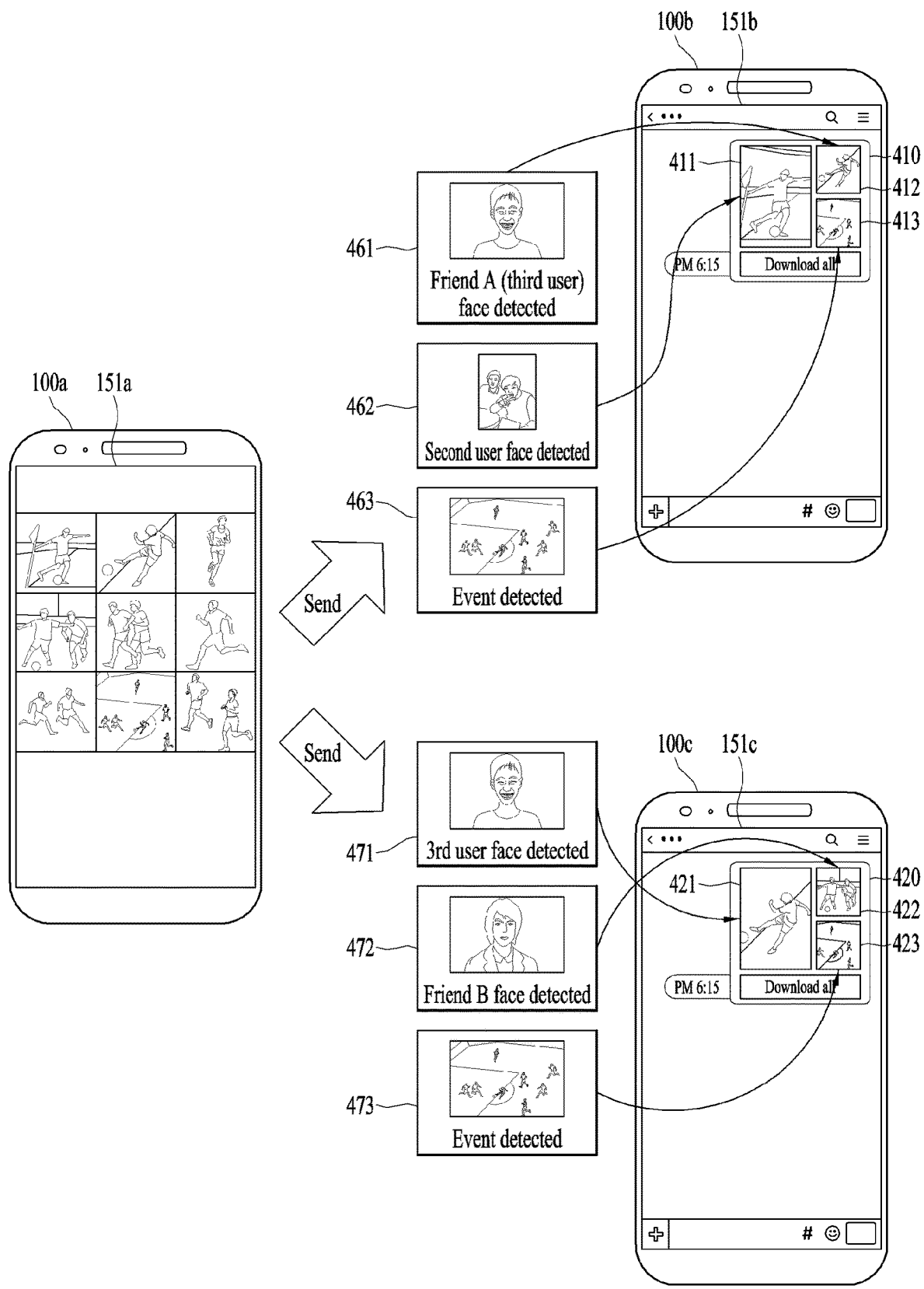
FIG. 4 is a diagram for the concepts of group classification and display according to various embodiments of the present invention.

FIG. 4 is a diagram for the concepts of group classification and display according to various embodiments of the present invention.

Referring to FIG. 4, a first terminal 100a may transmit a plurality of contents (e.g., a plurality of images) to each of a second terminal 100b and a third terminal 100c. Herein, a plurality of the images transmitted to the second terminal 100b and the third terminal 100c by the first terminal 100a may include the same images.

Based on user information of a second user corresponding to a user of the second terminal 100b, the second terminal 100b may classify a plurality of the images transmitted from the first terminal 100a into a plurality of groups. For instance, the second terminal 100b may detect an event corresponding to a friend A (i.e., a third user) corresponding to a friend of the second user, the second user and a transmitted image among a plurality of the transmitted images. In particular, the second terminal 100b may detect an image including a face of the friend A from a plurality of the transmitted images [461], detect an image including a face of the second user [462], and detect an image related to an event corresponding to the transmitted image [463]. And, the second terminal 100b may classify a plurality of the received images into groups of the second user, the friend A and the event, respectively. The second terminal 100b may display a thumbnail for each of a plurality of the classified groups. For instance, the second terminal 100b may display a first thumbnail 411 of a first group corresponding to the second user, a second thumbnail 412 of a second group corresponding to the friend A, and a third thumbnail 413 of a third group corresponding to the event on a message window 410. Moreover, the second terminal 100b may selectively download and save an image included in each of the gr5oups classified as a plurality of the groups. For instance, if obtaining an input to a thumbnail of a group, which is desired to be saved, among thumbnails for a plurality of the groups, the second terminal 100b may save the image included in the group corresponding to the obtained input. Moreover, the second terminal 100b may obtain an input for saving all of a plurality of the received images as well. For instance, if obtaining an input for selecting a 'Download all' menu 419 displayed on the message window 410, the second terminal 100b may download and save all of a plurality of the received images.

Based on user information of a third user corresponding to a user of the third terminal 100c, the third terminal 100c may classify a plurality of the images transmitted from the first terminal 100a into a plurality of groups. For instance, the third terminal 100c may detect an event corresponding to the third user, a friend B (i.e., a friend of the third user) and a transmitted image among a plurality of the transmitted images. In particular, the third terminal 100c may detect an image including a face of the third user from a plurality of the transmitted images [471], detect an image including a face of the friend B [472], and detect an image related to an event corresponding to the transmitted image [473]. And, the third terminal 100c may classify a plurality of the received images into groups of the third user, the friend B and the event, respectively. The third terminal 100c may display a thumbnail for each of a plurality of the classified groups. For instance, the third terminal 100c may display a first thumbnail 421 of a first group corresponding to the third user, a second thumbnail 422 of a second group corresponding to the friend B, and a third thumbnail 423 of a third group corresponding to the event on a message window 420. Moreover, the third terminal 100c may selectively download and save an image included in each of the groups classified as a plurality of the groups. For instance, if obtaining an input to a thumbnail of a group, which is desired to be saved, among thumbnails for a plurality of the groups, the third terminal 100c may save the image included in the group corresponding to the obtained input. Moreover, the third terminal 100c may obtain an input for saving all of a plurality of the received images as well. For instance, if obtaining an input for selecting a 'Download all' menu 429 displayed on the message window 420, the third terminal 100c may download and save all of a plurality of the received images.

Thus, the terminal 100 according to various embodiments of the present invention may receive a plurality of contents shared with a plurality of users, analyze a content including a user himself or a character intimate with the user among a plurality of the received contents, and classify the analyzed content as each group. And, the terminal 100 may selectively display or save the analyzed contents classified by a plurality of groups. Hence, the user can check a user-desired content among a plurality of the received contents and save the desired content only, with ease.

Figure 5:
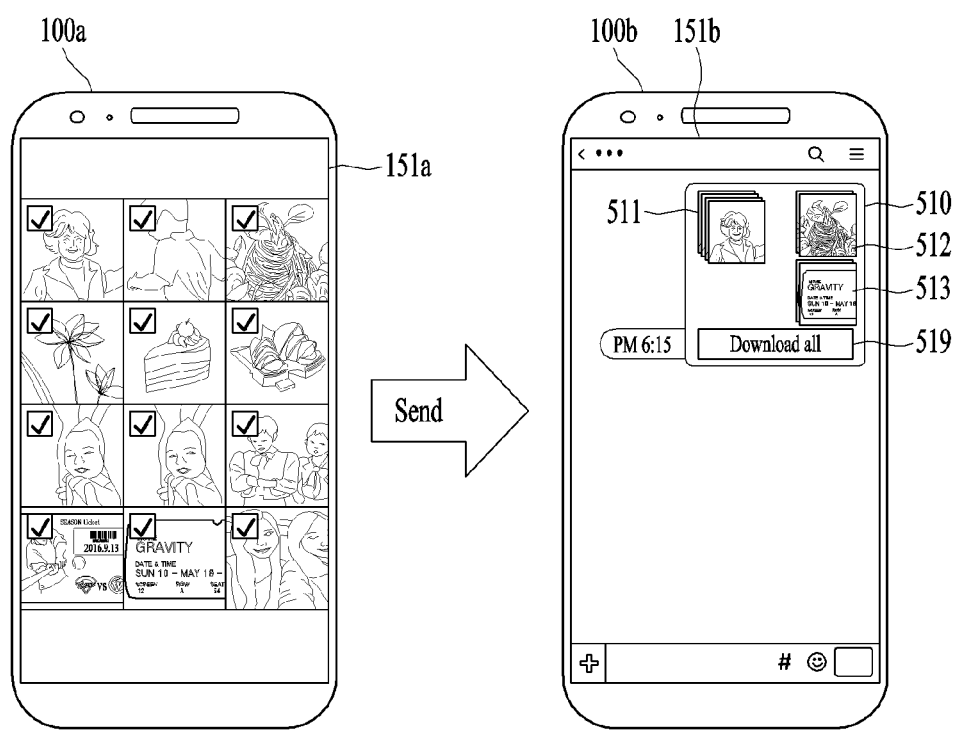
FIG. 5 is a diagram for an example of saving a transmitted content selectively according to various embodiments of the present invention.

FIG. 5 is a diagram for an example of saving a transmitted content selectively according to various embodiments of the present invention.

Referring to FIG. 5, a first terminal 100a may transmit a plurality of contents, e.g., a plurality of images to a second terminal 100b. The second terminal 100b may receive a plurality of the transmitted images and classify a plurality of the received images into a plurality of groups based on user information. The second terminal 100b may display a thumbnail for each of a plurality of the groups. For one example, the second terminal 100b may display a first thumbnail 511, a second thumbnail 512 and a third thumbnail 513 corresponding to a first group, a second group and a third group on a message window 510, respectively. If obtaining an input for selecting a thumbnail of a group corresponding to an image desired to be saved from a plurality of the displayed thumbnail, the second terminal 100*b* may save the image included in the group corresponding to the obtained input. Herein, the input for selecting the thumbnail corresponding to the group desired to be saved may include a short or long touch input or a force touch. And, the input for selecting the thumbnail corresponding to the group desired to be saved may include an input according to a preset gesture. For instance, if obtaining an input for selecting the first thumbnail 511 corresponding to the first group, the second terminal 100*b* may save at least one image included in the first group corresponding to the first thumbnail 511. Moreover, the second terminal 100*b* display a 'Download all' menu 519 for saving all of a plurality of the received images. If obtaining an input for selecting the 'Download all' menu 519 *d*, the second terminal 100*b* may download and save all of a plurality of the received images.

Meanwhile, based on a transmission amount and importance of each of a plurality of classified groups, the terminal (e.g., electronic device) 100 may output a content included in each of a plurality of the groups as well. For instance, when the controller 180 displays a thumbnail for each of a plurality of the groups, it may display a thumbnail in size corresponding to at least one of a data size of a content included in each of a plurality of the groups and the number of contents. Moreover, based on at least one of a data size of a content included in each of a plurality of the groups and the number of contents, the controller 180 may output the content included in each of the groups at a rate corresponding to at least one of a data size of a content included in each of the groups and the number of contents. The controller 180 may output a content, which is included in a high-importance content belonging group or a high-importance group, in size greater than that of a content belonging to another group, or display a thumbnail corresponding to the high-importance group in size greater than that of a thumbnail corresponding to another group. Herein, the importance may include an importance set for a content or an importance set for a reference corresponding to a group.

A configuration for the terminal 100 according to various embodiments to analyze user tendency according to user's terminal use and output a received content on the basis of the analyzed user tendency is described in detail as follows. Herein, the user tendency may be included in the aforementioned user information.

Figure 6:
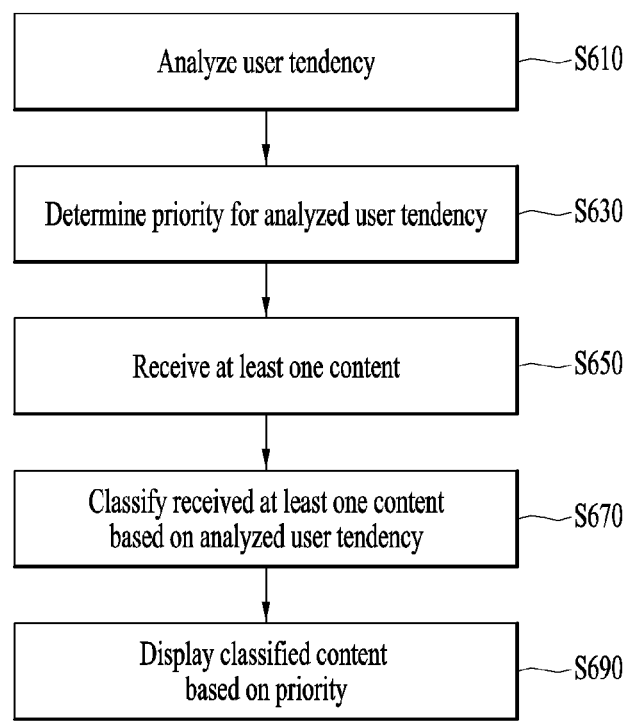
FIG. 6 is a diagram for an operation of outputting a content based on a user tendency analysis and an analyzed tendency according to various embodiments of the present invention.

FIG. 6 is a diagram for an operation of outputting a content based on a user tendency analysis and an analyzed tendency according to various embodiments of the present invention.

Referring to FIG. 6, the terminal 100 may analyze user tendency [S610].

The controller 180 of the terminal 100 may analyze user tendency based on user's terminal use history. For instance, the controller 180 collects such user's terminal use histories as a frequently viewed content history, a frequently accessed website history, a frequently inputted keyword history, a frequently downloaded content history and the like and may be able to analyze the user tendency based on the collected use histories. Herein, the user tendency may include information on user's interested field and preference, information on theme, character, substance and place contained in a content frequently read by a user, and information on theme, character, substance and place for a content frequently downloaded by a user.

The terminal 100 may determine a priority for the analyzed user tendency [S630].

Based on the analyzed user tendency, the controller 180 of the terminal 100 may determine a priority for a classification reference according to the analyzed user tendency. Herein, the classification reference may include a reference for classifying a plurality of the received contents mentioned in the foregoing description into a plurality of groups. Hence, the controller 180 may determine a priority for each of a plurality of the groups.

For instance, based on the analyzed user tendency, the controller 180 may determine a first character, a second character and a first thing as the classification references and determine priorities among the first character, the second character and the first thing. A corresponding detailed embodiment shall be described later.

The terminal 100 may receive at least one content [S650].

The terminal 100 may receive at least one or more contents from various devices such as a different terminal 100, a server and the like. The terminal 100 may receive at least one content by directly communicating with the different terminal 100, the server or the like, or may receive at least one content through a network. Herein, the at least one content received by the terminal 100 may include at least one content selected and sorted by a counter part or a counterpart device having transmitted the corresponding content or at least one content received by a plurality of terminals at a time.

The terminal 100 may classify the received at least one content based on the analyzed user tendency [S670].

The controller 180 may classify the received at least one content by at least one classification reference according to the analyzed user tendency.

For instance, based on the analyzed user tendency, the controller 180 may classify the received at least one content by a high priority classification reference. For one example, the controller 180 recognizes at least one of a character, a thing, a place and an event contained in the received at least one content and may then classify the recognized at least one by at least one classification reference according to user tendency.

Meanwhile, since the user tendency is included in the aforementioned user information, the step for the controller 180 to classify the received at least one content based on the analyzed user tendency may correspond to the former step of classifying a plurality of the received contents into a plurality of the groups based on the user information.

The terminal 100 may display the classified content based on the determined priority [S690].

The controller 180 may display the at least one content classified by the classification reference based on the determined priority. For instance, the controller 180 may display the content by adjusting a size of the content according to the priority or by adjusting a content displayed location according to the priority. For one example, the controller 180 may display a content of a high priority in large size and may also display a content of low content in small size. The controller 180 may display a content of a high priority and a content of a low priority on a top end and a bottom end of a screen, respectively.

Meanwhile, since the priority is included in the aforementioned user information, the step for the terminal 100 to display the classified content based on the determined priority may correspond to the former step of outputting the content in order or form corresponding to the recipient information.

A detailed embodiment is described with reference to FIG. 7.

Figure 7:
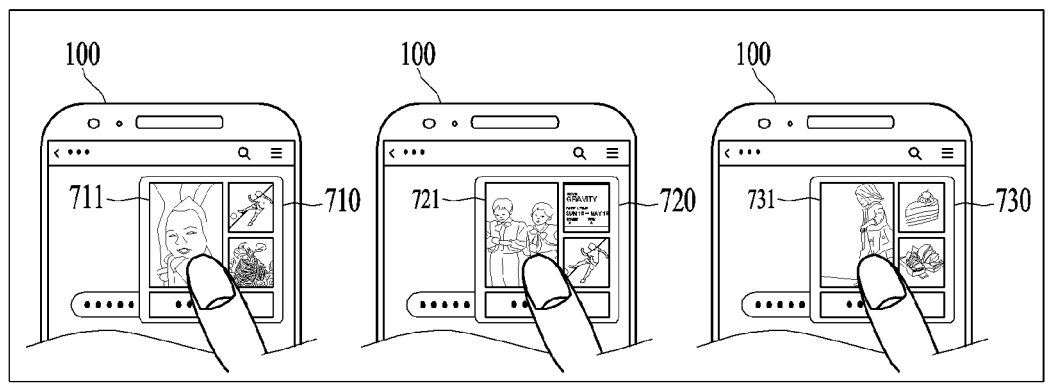
FIG. 7 is a diagram for examples of a user tendency analysis and a content display depending on an analyzed user tendency according to various embodiments of the present invention.
Figure 7:
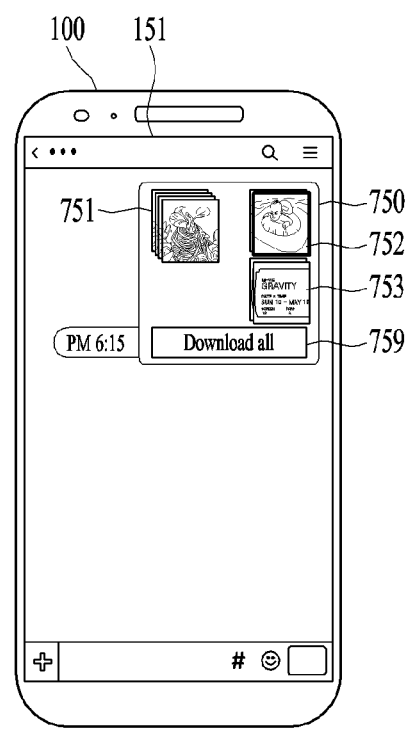
Figure 7:
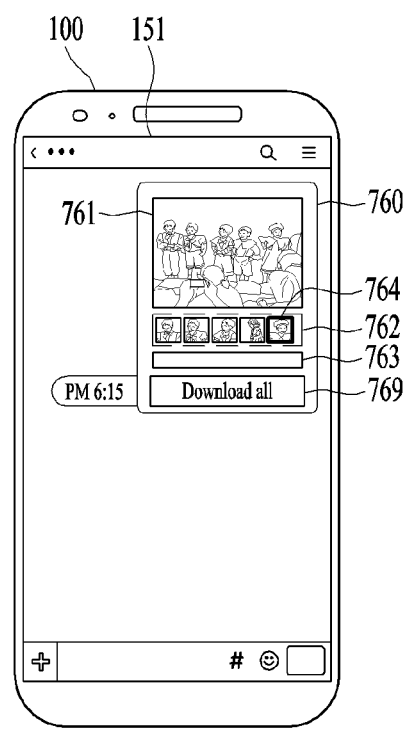

FIG. 7 is a diagram for examples of a user tendency analysis and a content display depending on an analyzed user tendency according to various embodiments of the present invention.

Referring to FIG. 7(a), the controller 180 of the terminal 100 may analyze user's terminal use history, e.g., an image read history. For instance, based on an image read history or an image saved history, the controller 180 may analyze that a user has selected and saved baby contained images 711, 721 and 731 frequently or that the images have been frequently displayed on a full screen. Hence, the controller 180 may analyze that a user tendency corresponds to a great interest in a baby contained content. If a baby contained content exists among the received contents, the controller 180 may classify a group corresponding to the baby contained content as a high priority.

For instance, referring to FIG. 7(b), the controller 180 may display thumbnails 751 to 753 of first to third groups, which result from classifying a plurality of received images into a plurality of groups, on a message window 750, respectively. Although a quantity of a baby contained image is small in a plurality of the received images, the controller 180 may classify the second group having the baby contained image belong thereto as a high group and display the thumbnail 752 corresponding tot the second group at a location capable of facilitating user's check. Hence, the user can easily check the baby contained image preferred by the user.

For instance, referring to FIG. 7(c), the controller 180 may display thumbnails corresponding to a plurality of characters or things contained in a received video 761 on a preview region 762 and may also display a progress bar 763 of the video 761 on a message window 760. Although a baby contained section in the received video 761 is short, the controller 180 may display a thumbnail 764 indicating the baby contained section. Hence, a user can easily check a baby contained region preferred by the user in the whole sections of the video 761.

The terminal 100 according to various embodiments may create an edited content for a content. This is described as follows.

Figure 8:
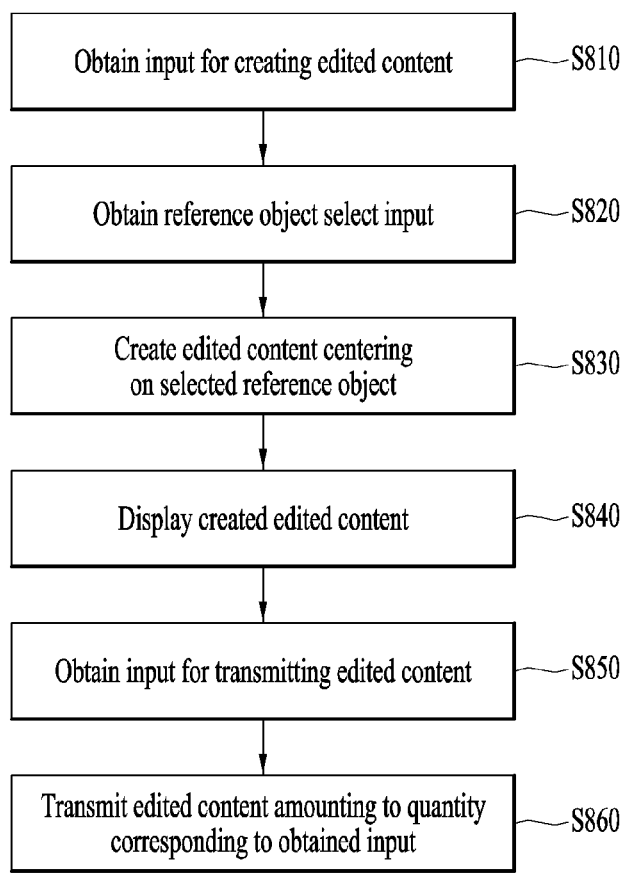
FIG. 8 is a flowchart for an edited content creation and a transmission operation according to various embodiments of the present invention.

FIG. 8 is a flowchart for an edited content creation and a transmission operation according to various embodiments of the present invention.

Referring to FIG. 8, the terminal 100 may obtain an input for creating an edited content [S810].

The controller 180 may obtain various inputs for creating an edited content. For instance, as an input for creating an edited content, the controller 180 may obtain an input of long touching or force-touching a region corresponding to a content to edit. Herein, the region corresponding to the content may include a content displayed region or a thumbnail region corresponding to the content. For another instance, as an input for creating an edited content, the controller 180 may obtain an input for selecting an editing menu. Besides, various inputs may be set as an input for creating an edited content.

The terminal 100 may obtain a select input for selecting a reference object [S820].

The controller 180 may obtain a select input for selecting a reference object to determine a theme or an inclusive quantity of an edited content to be created. For instance, the controller 180 may obtain an input for selecting an object displayed on a content as a select input for selecting a reference object.

Centering on the selected reference object, the terminal 100 may create an edited content [S830].

The controller 180 may create an edited content including a region or section containing the selected reference object. The controller 180 may create the edited content in a manner that a quantity containing the selected reference object is equal to or greater than a predetermined reference quantity in the whole quantities of the edited content. Hence, although the quantity of the selected reference object is small, the controller 180 can create the edited content containing the selected reference object over the predetermined reference quantity. Herein, the reference quantity may set variously according to user settings or a quantity of the reference object contained in the content.

Meanwhile, if the terminal 100 fails to obtain the select input for selecting the reference object, it may create an edited content without the reference object. Hence, the controller 180 may create an edited content without a specific reference for a content to edit.

The terminal 100 may display the created edited content [S840].

The controller 180 may display the created edited content on the display unit 151. For instance, the controller 180 may output the created edited content, or may output a thumbnail for the created edited content.

A detailed embodiment for the edited content creation of the terminal 100 is described with reference to FIG. 9.

Figure 9:
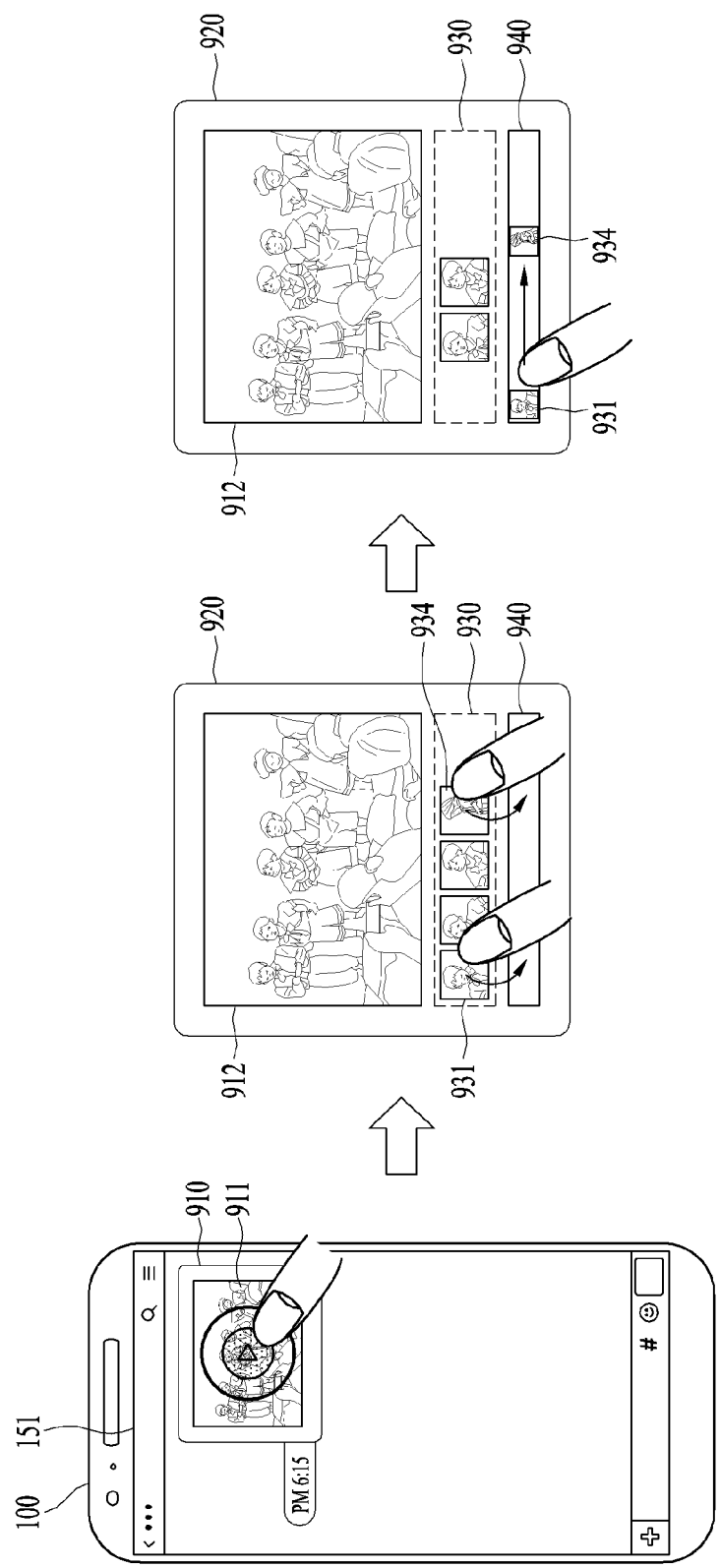
FIG. 9 is a diagram for an example of an edited video creation according to various embodiments of the present invention.

FIG. 9 is a diagram for an example of an edited video creation according to various embodiments of the present invention.

Referring to FIG. 9, as an input for creating an edited video, the controller 180 may obtain an input of touching a thumbnail 911 of a first video from a message window 910 displayed on the display unit 151. The controller 180 may display an editing window 920, and may display the first video 912, a thumbnail region 930 for a character or thing contained in the first video 912, and a reference object region 940 on the editing window 920. Herein, the thumbnail region 930 may include a region for displaying a thumbnail for a main character or thing contained in the first video 912 corresponding to an video to be edited, and the reference object region 940 may include a region for displaying a thumbnail corresponding to a character or thing selected as a reference object. As an input for selecting the reference object, the controller 180 may obtain an input of shifting a thumbnail for a character or thing displayed on the thumbnail region 930 to the reference object region 940. The controller 180 may recognize that the character or thing corresponding to the thumbnail shifted to the reference object region 940 is selected as the reference object. Hence, a user can select the reference object by shifting the thumbnail for the character or thing to select as the reference object to the reference object region 940. For one example, the controller 180 may obtain an input of shifting a second user thumbnail 931 and a friend-B thumbnail 934 displayed on the thumbnail region 930 to the reference object region 940. The controller 180 may recognize that the second user and the friend B are selected as reference objects. And, the controller 180 may receive a setting of a quantity or importance of a selected reference object in an edited content to be created. For one example, the controller 180 may obtain an input of dragging & dropping the second user thumbnail, which is displayed on the reference object region 940, in a right direction, and may increase a quantity of the second user to be contained in the edited content in response to a drag-shifted distance of the second user thumbnail 931. Moreover, the controller 180 may obtain an input of dragging & dropping the second user thumbnail 931 in a left direction, and may decrease a quantity of the second user to be contained in the edited content in response to a drag-shifted distance of the second user thumbnail 931. Thus, the terminal 100 may obtain an input for an importance or quantity of a corresponding reference object in an edited content in response to a drag & drop distance of a thumbnail in the reference object region 940. And, the terminal 100 may create an edited content based on the obtained importance or quantity of the reference object.

FIG. 8 is referred to again.

The terminal 100 may obtain an input for transmitting the edited content [S850] and then transmit the edited content of the quantity corresponding to the obtained input [S860].

The controller 180 may obtain various inputs for transmitting the edited content, transmit one of edited contents having different reference contents, and also transmit an original content of the edited content.

This is described with reference to FIGS. 10 to 15.

Figure 10:
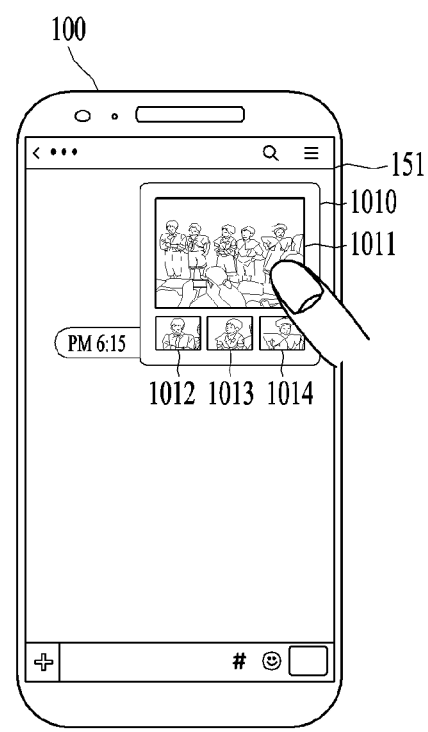
FIG. 10 is a diagram for an example of an original content transmission according to various embodiments of the present invention.

FIG. 10 is a diagram for an example of an original content transmission according to various embodiments of the present invention.

Referring to FIG. 10, the terminal 100 may display a message window 1010 for transmitting a content on the display unit 151. On the message window 1010, the controller 180 may display an original video thumbnail 1011, a first edited video thumbnail 1012, a second edited video thumbnail 1013 and a third edited video thumbnail 1014. Herein, the first edited video thumbnail 1012 may include a thumbnail of an edited video having a reference object set to a fifth character, the second edited video thumbnail 1013 may include a thumbnail of an edited video having a reference object set to a sixth character, and the third edited video thumbnail 1014 may include a thumbnail of an edited video having a reference object set to a seventh character. The controller 180 may obtain an input for selecting the original video thumbnail 1011 as an input for transmitting an original content. Hence, the controller 180 may transmit the original video to another terminal.

Figure 11:
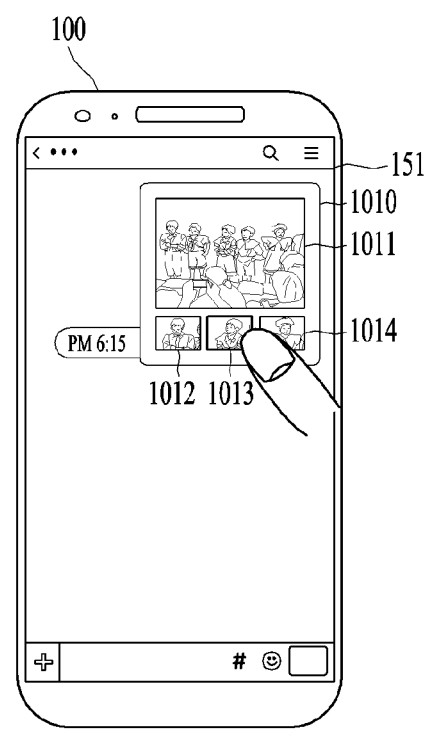
FIG. 11 is a diagram for an example of an edited content transmission according to various embodiments of the present invention.

FIG. 11 is a diagram for an example of an edited content transmission according to various embodiments of the present invention.

Referring to FIG. 11, the terminal 100 may display a message window 1010 for transmitting a content on the display unit 151. On the message window 1010, the controller 180 may display an original video thumbnail 1011, a first edited video thumbnail 1012, a second edited video thumbnail 1013 and a third edited video thumbnail 1014. Herein, the first edited video thumbnail 1012 may include a thumbnail of an edited video having a reference object set to a fifth character, the second edited video thumbnail 1013 may include a thumbnail of an edited video having a reference object set to a sixth character, and the third edited video thumbnail 1014 may include a thumbnail of an edited video having a reference object set to a seventh character. The controller 180 may obtain an input for selecting the second edited video thumbnail 1013 as an input for transmitting a second edited video. Hence, the controller 180 may transmit the second edited video having the reference object set to the sixth character to another terminal.

The terminal 100 according to various embodiments may transmit an edited content corresponding to a character or object selected from a displayed content. This is described with reference to FIG. 12.

Figure 12:
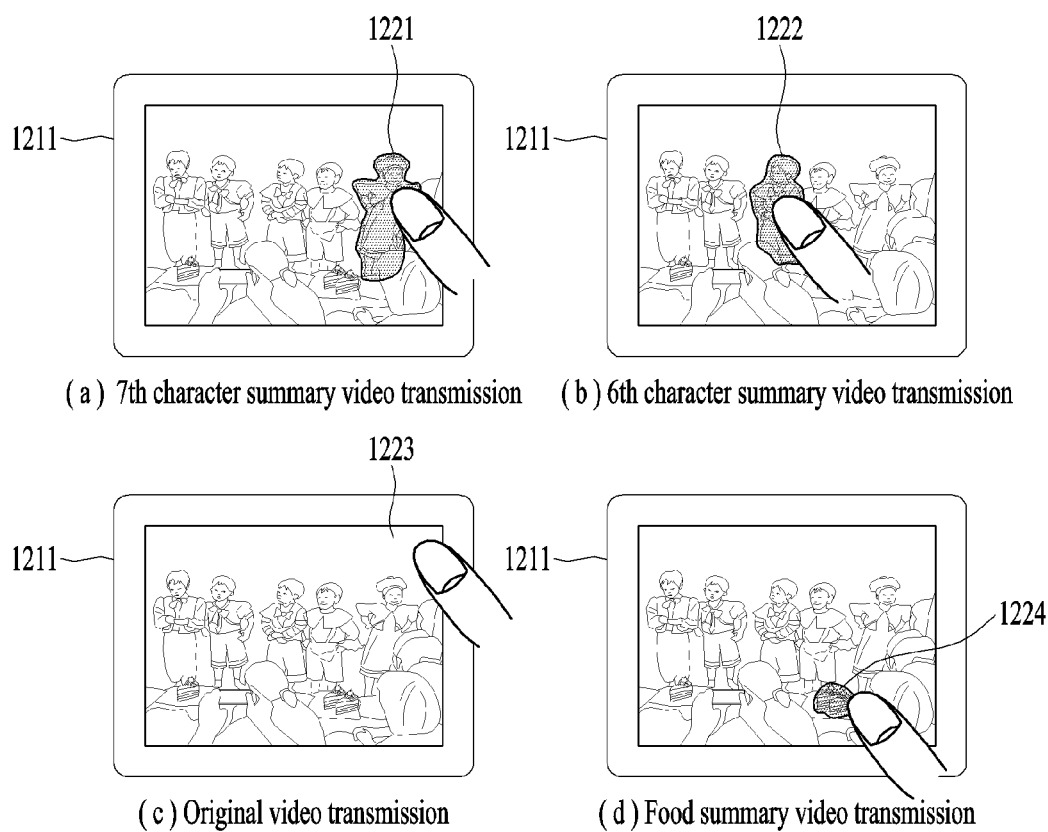
FIG. 12 is a diagram for an example of a transmission of an edited content corresponding to a selected region according to various embodiments of the present invention.

FIG. 12 is a diagram for an example of a transmission of an edited content corresponding to a selected region according to various embodiments of the present invention.

Referring to FIG. 12(*a*), the controller 180 may display a thumbnail 1211 for a first video. The controller 180 may obtain an input for selecting a region 1221 corresponding to a seventh character from the display thumbnail 1211. In response to the obtained input, the controller 180 may transmit a third edited video having a reference object set to the seventh character.

Referring to FIG. 12(*b*), the controller 180 may display a thumbnail 1211 for a first video. The controller 180 may obtain an input for selecting a region 1222 corresponding to a sixth character from the display thumbnail 1211. In response to the obtained input, the controller 180 may transmit a second edited video having a reference object set to the sixth character.

Referring to FIG. 12(*c*), the controller 180 may display a thumbnail 1211 for a first video. The controller 180 may obtain an input for selecting a background region 1223 from the display thumbnail 1211. In response to the obtained input, the controller 180 may transmit an original video.

Referring to FIG. 12(*d*), the controller 180 may display a thumbnail 1211 for a first video. The controller 180 may obtain an input for selecting a region 1224 corresponding to food from the display thumbnail 1211. In response to the obtained input, the controller 180 may transmit a food summary edited video having a reference object set to the food.

The terminal 100 according to various embodiments may display a pictogram for an edited video and then transmit an edited video corresponding to a selected pictogram. Herein, the pictogram may include an icon. This is described with reference to FIG. 13.

Figure 13:
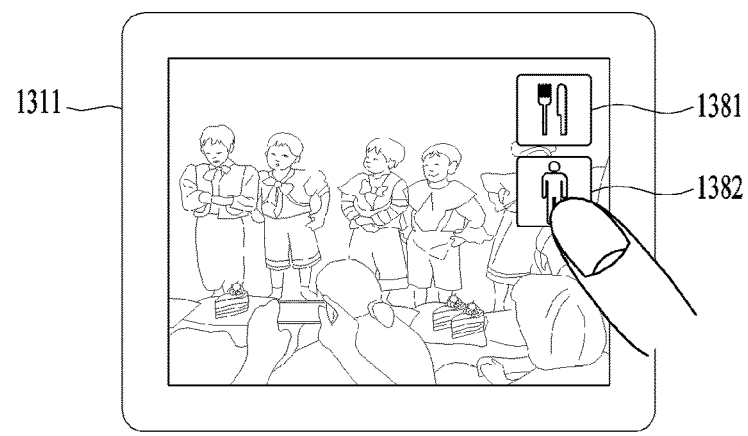
FIG. 13 is a diagram for an example of an edited video transmission in response to a pictogram selection according to various embodiments of the present invention.

FIG. 13 is a diagram for an example of an edited video transmission in response to a pictogram selection according to various embodiments of the present invention.

Referring to FIG. 13, the controller 180 may display a thumbnail 1311 for a first video. As an edited video for the first video, if there are an edited video for food and an edited video for character, the controller 180 may display a food pictogram 1381 and a character pictogram 1382. If obtaining an input for selecting the display pictogram, the controller 180 may transmit the edited video corresponding to the selected pictogram. For instance, if obtaining an input for selecting the food pictogram 1381, the controller 180 may transmit a food summary edited video. In case that a plurality of edited videos correspond to a single pictogram, if the corresponding pictogram is selected, the controller 180 may display a subpictogram or a submenu. If obtaining an input for selecting the subpictogram or the submenu, the controller 180 may transmit an edited video corresponding to the selected subpictorgram or submenu. For one example, if a character pictogram 1382 is selected, the controller 180 may display a submenu for each of a plurality of characters (e.g., fifth to seventh characters). If the fifth character is selected, the controller 180 may transmit a first edited video having a reference object set to the fifth character.

Meanwhile, if obtaining an input of short touching a displayed thumbnail, the controller 180 may transmit an edited video of the selected thumbnail. If obtaining an input of long touching or double tapping a displayed thumbnail, the controller 180 may transmit an original video of the selected thumbnail.

The terminal 100 according to various embodiments may display a folder for some or all of contents and then transmit some or all of the contents based on an input to the displayed folder. This is described with reference to FIG. 14 and FIG. 15.

Figure 14:
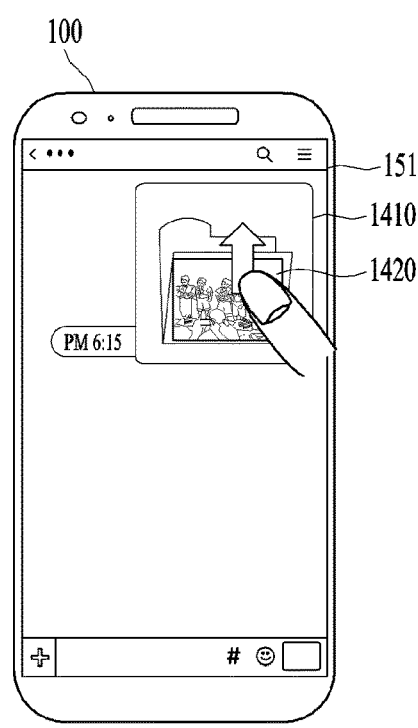
FIG. 14 is a diagram for an example of a full content transmission according to various embodiments of the present invention.

FIG. 14 is a diagram for an example of a full content transmission according to various embodiments of the present invention.

Referring to FIG. 14, the controller 180 of the terminal 100 may display a full folder 1420 indicating all received contents on a message window 1410. If obtaining an input of dragging or swiping the full folder 1420 in a prescribed direction, the controller 180 may transmit all the received contents.

Figure 15:
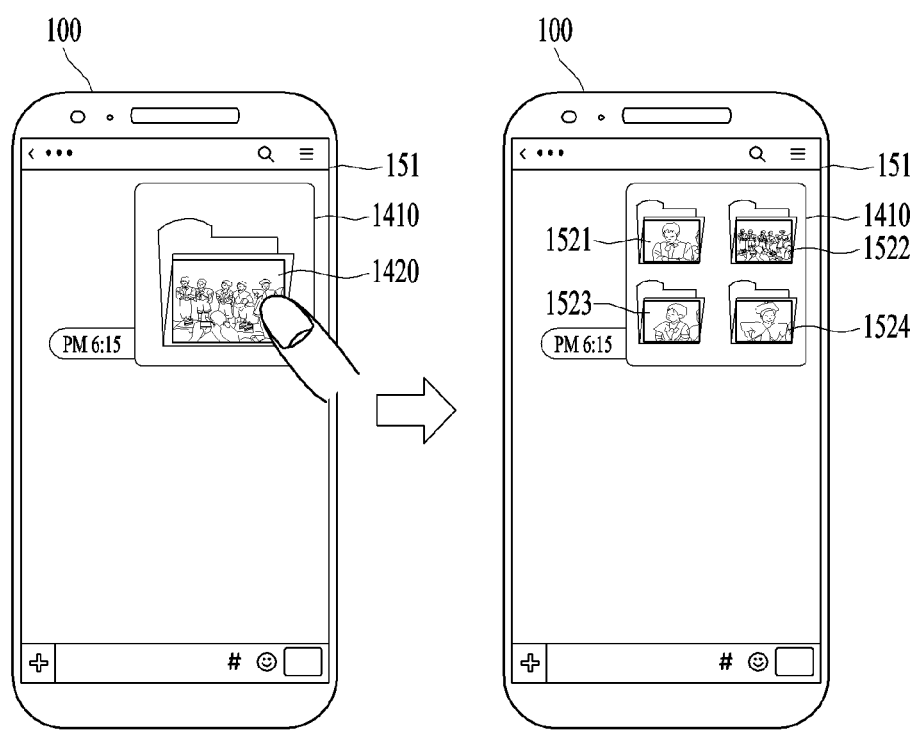
FIG. 15 is a diagram for an example of a partial content transmission according to various embodiments of the present invention.

FIG. 15 is a diagram for an example of a partial content transmission according to various embodiments of the present invention.

Referring to FIG. 15, the controller 180 of the terminal 100 may display a full folder 1420 indicating all received contents on a message window 1410 and then obtain an input of selecting the displayed full folder 1420. In response to the obtained input, the controller 180 may display a plurality of subfolders 1521 to 1524 resulting from classifying all contents. The controller 180 may transmit a content included in the subfolder selected from a plurality of the displayed subfolders 1521 to 1524. For instance, if obtaining an input for selecting the second subfolder 1522, the controller 180 may transmit a content included in a group corresponding to the second subfolder 1522. Moreover, if obtaining an input for selecting a plurality of the subfolders, the controller 180 may transmit contents included in a plurality of groups corresponding to a plurality of the selected subfolders.

When the terminal 100 according to various embodiments creates an edited content, it may edit an index only without changing data of an original content and then transmit index data of the edited index only. This is described with reference to FIG. 16.

Figure 16:
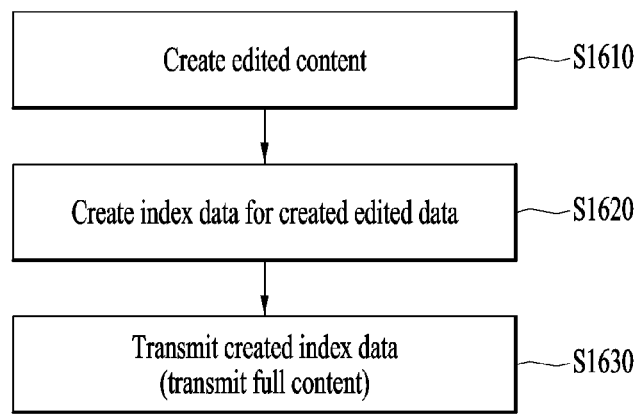
FIG. 16 is a flowchart for an index data creation and a transmission operation according to various embodiments of the present invention.

FIG. 16 is a flowchart for an index data creation and a transmission operation according to various embodiments of the present invention.

Referring to FIG. 16, the terminal 100 may create an edited content [S1610], and create index data for the created edited content [S1630].

The controller 180 may create an edited content and index data for the created edited content. Herein, the index data may include data indicating a portion of original data contained in the edited content. Hence, based on the original content and the created index data, the controller 180 may output an edited content. As the edited content creation of the terminal 100 has been mentioned in the foregoing description, its details shall be omitted from the following.

The terminal 100 may transmit the created index data [S1650].

The controller 180 may transmit the created index data to another terminal. Hence, having received the transmitted data, the corresponding terminal may output the edited content based on the index data. Meanwhile, if the terminal configured to receive the index data fails to have an original content corresponding to the index data, the controller 180 may transmit full data of the original content.

Meanwhile, the terminal 100 may receive index data for an edited content created by a different user and then output a content identical to the edited content created by the different user based on the received index data. Hence, without receiving each of a plurality of edited contents created by a plurality of users for a single content, the terminal 100 may output a plurality of the edited contents created by a plurality of the users. Moreover, based on the received index data, the terminal 100 may determine an overlapping section or region in a plurality of edited contents respectively created by a plurality of users for a single content and then transmit the overlapping section or region.

The terminal 100 according to various embodiments may create and manage metadata for a sharing such as a content transmission. For instance, the terminal 100 may create and manage metadata including information on a different terminal or a user of the different terminal with which an original or edited content is shared. Hence, a user of the terminal 100 may check whether the original or edited content is shared with a prescribed user, whether the original or edited content is delivered to a prescribed user, and/or whether the original or edited content is delivered from a prescribed person or terminal. And, the metadata may include section information indicating a shared edited content corresponds to a prescribed section of the original content, information on a reference object, information on a publication range of the edited content and the like. This is described with reference to FIG. 17.

Figure 17:
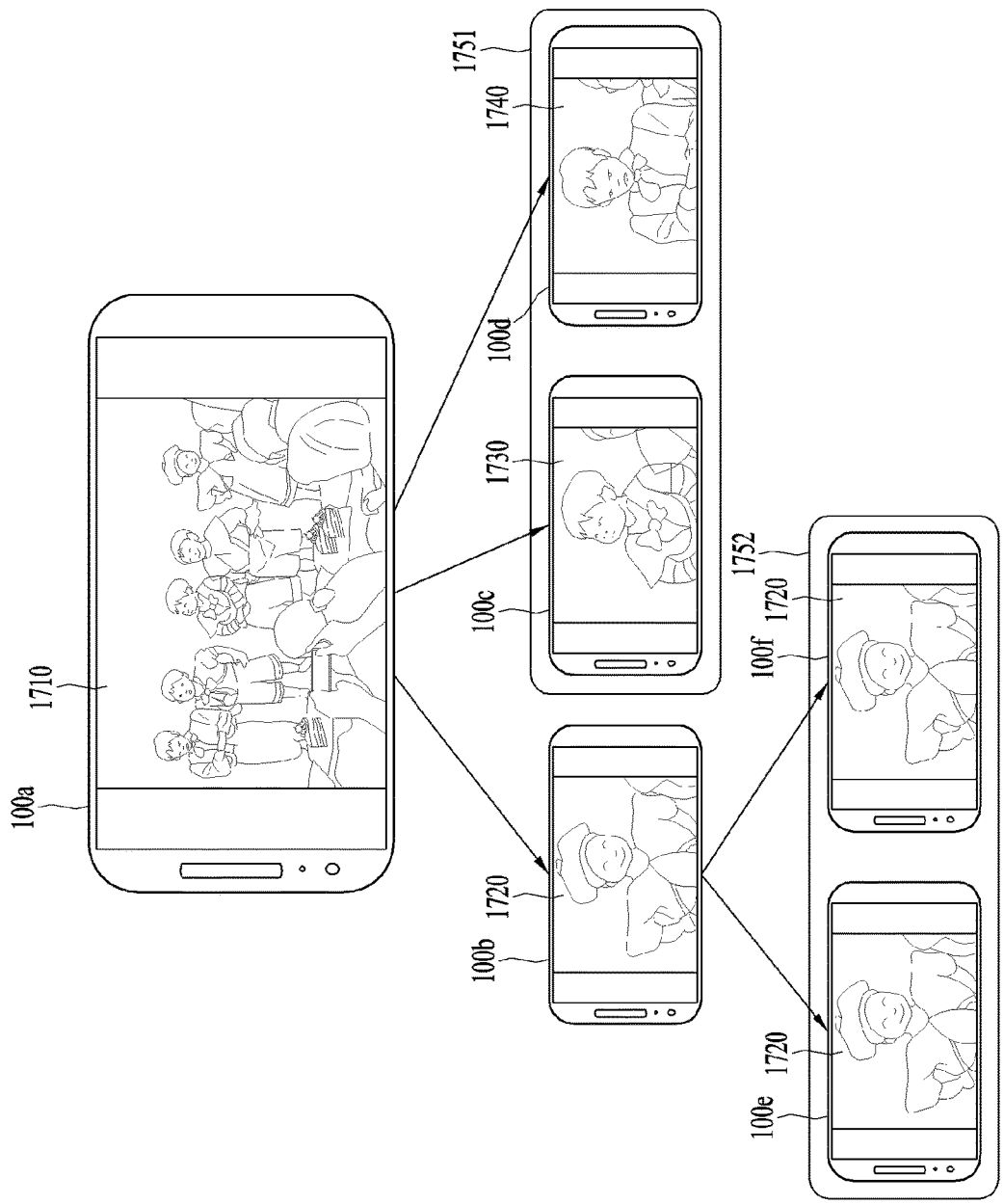
FIG. 17 is a diagram for an example of a shared information included in metadata according to various embodiments of the present invention.

FIG. 17 is a diagram for an example of a shared information included in metadata according to various embodiments of the present invention.

Referring to FIG. 17, a first terminal 100a may include a terminal having an original content 1710 and create a first edited content 1720, a second edited content 1730 and a third edited content 1740, which are edited contents of the original content 1710. The first terminal 100a may share the second edited content 1730 with a second terminal 100b. The second terminal 100b may share the shared second edited content 1730 with a fifth terminal 100e and a sixth terminal 100f. And, the first terminal 100a may share the second edited content 1730, which is a closed content, with a sharing-allowed third terminal 100c. The first terminal 100a may share the third edited content 1740, which is allowed to be shared with friends only, with a fourth terminal 100d corresponding to a friend's terminal. Herein, the third terminal 100c and the fourth terminal 100d may include terminals of users belonging to the same group. For instance, the third terminal 100c and the fourth terminal 100d may include terminals of users belonging to a first class 1751 corresponding to the same class. The fifth terminal 100e and the sixth terminal 100f may include terminals of users belonging to a second class 1752 corresponding to the same class. The first terminal 100a may create metadata for the aforementioned sharing history. Hence, the first terminal 100a may save and manage the sharing history of the original content 1710 and the edited contents 1720, 1730 and 1740 and information on a presence or non-presence of re-sharing, and the like. The first terminal 100a may save and manage information indicating that a terminal belonging to a prescribed group (e.g., first class 1751, second class 1752) shares a prescribed content. Hence, the terminal may create and manage various informations related to the content sharing.

The terminal 100 according to various embodiments may determine a network environment and receive a content based on the determined network environment. This is described with reference to FIG. 18 and FIG. 19.

Figure 18:
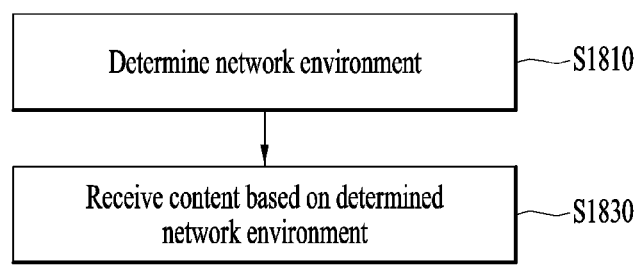
FIG. 18 is a flowchart for a content reception operation depending on a network environment according to various embodiments of the present invention.

FIG. 18 is a flowchart for a content reception operation depending on a network environment according to various embodiments of the present invention.

Referring to FIG. 18, the terminal 100 may determine a network environment [S1810].

The controller 180 of the terminal 100 may determine a network environment such as a connected state of a network, a strength of a signal and the like.

Based on the determined network environment, the terminal 100 may receive a content [S1830].

Based on the determined network environment, the controller 180 may determine a resolution and quantity of a content to receive and then receive the content of the determined resolution and quantity.

For instance, if a speed of the network is low, the controller 180 may receive a summarized edited content of the content.

For another instance, if a signal of the network is weak, the controller 180 may receive an edited content containing a user-interested target in a content based on user information.

For further instance, if the connected state of the network is not good, the controller 180 may receive an edited content resulting from lowering a resolution of a content.

Figure 19:
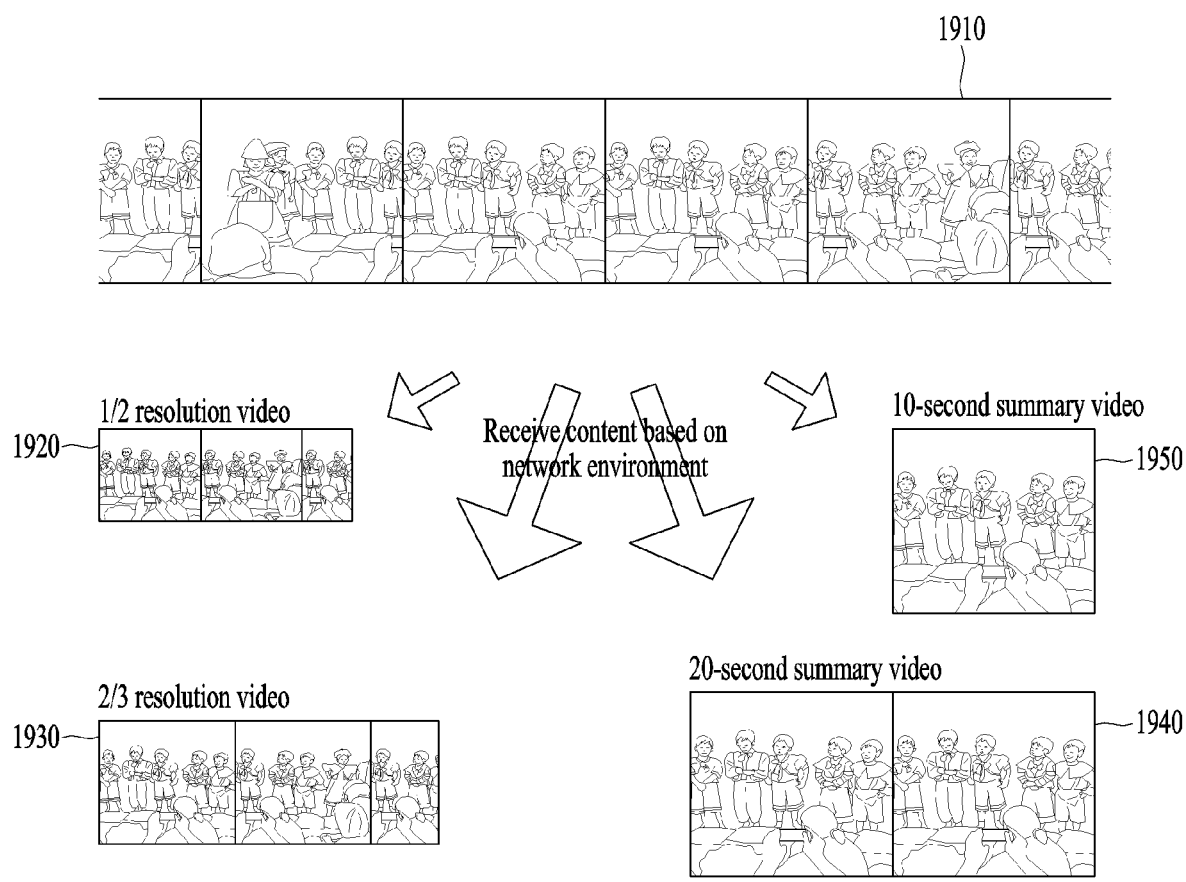
FIG. 19 is a diagram for the concept of a content reception depending on a network environment according to various embodiments of the present invention.

FIG. 19 is a diagram for the concept of a content reception depending on a network environment according to various embodiments of the present invention.

Referring to FIG. 19, in case of receiving an original video 1910, the terminal 100 may determine a network environment and then receive an edited content for the original video 1910 based on the determined network environment. Herein, the edited content may include a content resulting from changing resolution of an original content, a content resulting from reducing a quantity in an original content, or the like.

For one example, if the determined network environment is not appropriate for receiving the original video 1910, the terminal 100 may receive a video 1920 having ½ resolution of the original video 1910 or a video 1930 having ⅔ resolution of the original video 1910. Since the terminal 100 is capable of receiving the video 1920 or 1930 having the resolution lower than that of the original video 1910, the terminal 100 may receive a full quantity of the original video 1910 corresponding to a content desired to receive even in an unsmooth or poor network environment.

For another example, if the determined network environment is not appropriate for receiving the original video 1910, the terminal 100 may receive a 20-second summary video 1940 containing a major substance in a full quantity of the original video 1910 or a 10-second summary video 1950 containing a major substance in a full quantity of the original video 1910. Since the terminal 100 is capable of receiving the video 1940 or 1950 resulting from summarizing the original video 1910 in part, the terminal 100 may receive an edited content, which enables to major substance to be checked, corresponding to a content desired to receive even in an unsmooth or poor network environment.

Moreover, the terminal 100 may receive a summary video resulting from adjusting a resolution of an original video and summarizing a quantity of the original video. Details shall be omitted.

Meanwhile, when a plurality of images are transmitted, the terminal 100 may receive some of a plurality of the images and adjust a resolution of the received image, based on a determined network environment. For instance, based on user information, the terminal 100 may receive only an image with a high priority according to user tendency among a plurality of the images. Moreover, the terminal 100 may receive an image, which has a high priority according to user tendency among a plurality of the images, with an original resolution, and may receive an image, which has a low priority, by changing into a low resolution.

Although the above description of receiving a content based on a network environment determination of the terminal 100 and the determined network environment is made with reference to videos (or images) for clarity, it is applicable to various contents such as images, texts and the like as well as to videos.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A terminal, comprising:
   a memory;
   a display;
   a wireless communication unit; and
   a controller coupled with the memory, the display, and the wireless communication unit, wherein the controller is configured to:
   receive a plurality of contents through the wireless communication unit,
   classify the received plurality of contents into a plurality of groups based on recipient information, wherein the recipient information is information of a recipient corresponding to a user of the terminal, and wherein the recipient information contains a user tendency based on a user's terminal use history,
   control the display to output the plurality of contents classified into the plurality of groups in order based on the recipient information, wherein the display outputs a plurality of thumbnails respectively representing the plurality of the groups,
   obtain an input for selecting a specific thumbnail among the plurality of thumbnails, and
   save all contents included in a group corresponding to the specific thumbnail.

2. The terminal of claim 1, wherein the controller is further configured to:
   classify the plurality of contents into the plurality of groups with reference to a character included in each of the plurality of contents,
   determine a priority of each of the plurality of groups based on preference of the user for the character corresponding to each of the plurality of groups, and
   control the display to output the plurality of contents classified into the plurality of groups in order based on the determined priority.

3. The terminal of claim 2, wherein the controller controls the display to output the plurality of contents classified into the plurality of groups in a form based on the recipient information.

4. The terminal of claim 1, wherein the recipient information further comprises information on at least a preference, an interest, an interested place, a schedule or a character related to the recipient.

5. The terminal of claim 1, wherein the controller obtains a first input for creating an edited content for at least one content, obtains a second input for selecting a reference object becoming a reference for the creation of the edited content, and creates the edited content for the at least one content based on the recipient information and the selected reference object.

6. The terminal of claim 5, wherein the controller obtains a third input for transmitting the created edited content and controls the wireless communication unit to transmit the edited content having the reference object set to an object corresponding to the obtained third input.

7. A method of operating a terminal, comprising:
  receiving a plurality of contents through a wireless communication unit of the terminal;
  classifying the plurality of contents into a plurality of groups based on recipient information, wherein the recipient information is information of a recipient corresponding to a user of the terminal, and wherein the recipient information contains a user tendency based on a user's terminal use history;
  outputting the plurality of contents classified into the plurality of groups through a display of the terminal in order based on the recipient information, wherein the display outputs a plurality of thumbnails respectively representing the plurality of the groups;
  obtaining an input for selecting a specific thumbnail among the plurality of thumbnails; and
  saving all contents included in a group corresponding to the specific thumbnail.

8. The method of claim 7, wherein the classifying the plurality of contents into the plurality of groups comprises classifying the plurality of contents into the plurality of groups with reference to a character included in each of the plurality of contents, and
  wherein the outputting of the plurality of contents classified into the plurality of groups in the order corresponding to the recipient information comprises determining a priority of each of the plurality of groups based on preference of the user for the character corresponding to each of a plurality of groups and outputting the plurality of contents classified into the plurality of groups in the order corresponding to the determined priority.

9. The method of claim 8, further comprising outputting the plurality of contents classified into the plurality of groups in a form based on the recipient information.

10. The method of claim 7, wherein the recipient information further comprises information on at least one of the group consisting of preference, interest, interested place, schedule or character related to the recipient.

11. The method of claim 7, further comprising:
  obtaining a first input for creating an edited content for at least one content;
  obtaining a second input for selecting a reference object becoming a reference for the creation of the edited content; and
  creating the edited content for the at least one content based on the recipient information and the selected reference object.

12. The method of claim 11, further comprising:
  obtaining a third input for transmitting the created edited content; and
  transmitting the edited content having the reference object set to an object corresponding to the obtained third input.

* * * * *